US009819259B2

(12) United States Patent
Fawaz et al.

(10) Patent No.: US 9,819,259 B2
(45) Date of Patent: Nov. 14, 2017

(54) SYSTEM AND METHOD FOR A POWER CONVERSION SYSTEM (71) Applicant: Infineon Technologies Austria AG, Villach (AT)

(72) Inventors: Ali Fawaz, Dearborn, MI (US); Marcus Schaemann, Munich (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 0 days.

(21) Appl. No.: 14/954,488

(22) Filed: Nov. 30, 2015

(65) Prior Publication Data
US 2017/0155316 A1 Jun. 1, 2017

(51) Int. Cl.
*H02M 3/335* (2006.01)
*H02M 1/36* (2007.01)

(52) U.S. Cl.
CPC ......... *H02M 1/36* (2013.01); *H02M 3/33523* (2013.01)

(58) Field of Classification Search
CPC ..... H02M 3/33523; H02M 2001/0054; H02M 3/027; H02M 1/08; H02M 1/36; H05B 33/083; H05B 33/0842
USPC ........ 363/16–20, 21.04, 21.08, 21.12, 21.16, 363/21.18; 307/64, 66, 67; 315/291, 315/307, 241 R, 246, 247, 237, 238
See application file for complete search history.

(56) References Cited

U.S. PATENT DOCUMENTS

| | | | | |
|---|---|---|---|---|
| 5,859,768 A * | 1/1999 | Hall | ............... | H02M 3/33507 361/90 |
| 6,411,068 B1 * | 6/2002 | Willis | ............... | H02M 3/1563 323/282 |
| 7,206,343 B2 * | 4/2007 | Pearce | ............... | H02M 3/157 327/158 |
| 7,733,678 B1 * | 6/2010 | Notohamiprodjo | . | H02M 1/4225 323/222 |
| 7,791,909 B2 * | 9/2010 | Koo | ............... | H02M 3/33507 363/21.02 |
| 7,880,400 B2 * | 2/2011 | Zhou | ............... | H05B 33/0818 315/185 S |
| 8,723,442 B2 * | 5/2014 | Omi | ............... | H02M 1/36 315/241 R |
| 8,823,399 B1 * | 9/2014 | Bharathan | ............... | G01R 1/00 324/603 |
| 8,971,062 B2 * | 3/2015 | Huang | ............... | H02M 3/33523 363/21.16 |
| 2009/0103338 A1 | 4/2009 | Nakamura | | |
| 2013/0063990 A1 | 3/2013 | Yang | | |

* cited by examiner

*Primary Examiner* — Rajnikant Patel
(74) *Attorney, Agent, or Firm* — Slater Matsil, LLP (57) ABSTRACT

In accordance with an embodiment, a method of operating a power system includes operating a power converter at a first output power, monitoring a first input voltage at an input port of the power converter. The method further includes upon detecting that the first input voltage drops below a first pre-determined voltage threshold, reducing the first output power of the power converter to a second output power lower than the first output power, and suspending operation of the power converter after the reducing the first output power of the power converter.

29 Claims, 7 Drawing Sheets

SYSTEM AND METHOD FOR A POWER CONVERSION SYSTEM

TECHNICAL FIELD

This disclosure relates generally to an electronic device, and more particularly, to a system and method for a power conversion system.

BACKGROUND

Switched-mode circuits, including switched-mode power converters and motor controllers, are widely used in power conversion systems of many electronic applications from computers to automobiles. Generally, voltages within a switched-mode power conversion system are generated by performing a DC-DC, DC-AC, and/or AC-DC conversion by operating a switch coupled to an inductor or a transformer. Switched-mode power supplies are usually more efficient than other types of power conversion systems because power conversion is performed by controlled charging and discharging a low loss component, such as an inductor or transformer, therefore reducing energy lost due to power dissipation across resistive voltage drops. Similarly, switched-mode motor controllers may be used to efficiently commutate DC brushless motors with low losses in the driving circuitry.

During operation of a power conversion system, the input voltage supplied to the power conversion system may fluctuate and temporarily drop below a certain voltage threshold, causing a brown-out condition. To protect the power conversion system from the adverse effects caused by the brown-out condition, proper monitoring, control and operation procedures are needed.

SUMMARY

In accordance with an embodiment, a method of operating a power system includes operating a power converter at a first output power, monitoring a first input voltage at an input port of the power converter. The method further includes upon detecting that the first input voltage drops below a first pre-determined voltage threshold, reducing the first output power of the power converter to a second output power lower than the first output power, and suspending operation of the power converter after the reducing the first output power of the power converter.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a power conversion system with a flyback power converter. A skilled artisan will appreciate that embodiments of the present invention may also be applied to various power conversion systems that utilize other types of power converters, such as boost converters, buck converters, or other types of suitable power converters.

Embodiments of the present invention are directed toward measuring the AC line voltage of a power conversion system for the purpose of detecting a brown-out condition and/or a brown-in condition. In a power conversion system, the amplitude of the input AC voltage may fluctuate during normal operation (e.g., when the power converter is switching). When the input AC voltage drops below a low voltage threshold, a brown-out condition occurs. Brown-out conditions may have many adverse effects on the power system. For example, for a switched-mode power supply with a regulated output, as the input voltage falls, the current draw increases to maintain the same output, which may stress the power supply and compromise its reliability. Brown-out condition can also cause unexpected behavior in digital systems, since reduced voltages can bring signal levels below the threshold at which logic circuits can reliably detect which states are being represented by the signal levels. To avoid the adverse effects due to the brown-out condition and protect the system, various embodiment systems may detect the brown-out condition and respond by stopping or suspending the switching of the power converter. When the input AC voltage recovers from the voltage drop and rises above a predetermined high voltage threshold, a brown-in condition occurs. The various embodiment systems may detect the brown-in condition and respond by resuming the switching of the power converter.

In conventional systems that determine the AC line voltage by monitoring the rectified AC voltage at the input of the switched-mode power converter, some errors may be introduced due to coupled switching noise and resonant ringing due to inductances within the power supply. If a measurement of the AC line voltage is made during such a ringing condition, the measurement may result in an overestimate of the AC line voltage. For example, in a power system with an AC input voltage having a nominal peak amplitude of 110 V, a brown-out condition voltage threshold is specified at 80 V, and a brown-in condition voltage threshold is specified at 85 V. When the input AC voltage drops below the brown-out condition threshold (e.g., to 79 V), a measured value of the rectified AC voltage might, however, be over the brown-in condition threshold (e.g., at 86 V), due to the switching noise and resonant ringing. The spurious large measurement of 86 V might cause the power conversion system to make incorrect decisions regarding a subsequent brown-in condition detection.

In various embodiments of the present invention, the switching pattern of the switched-mode power converter is modified when a brown-out condition is detected such that the effect of the ringing condition is reduced or eliminated in the input voltage of the switched-mode power converter. For example, in one embodiment, the power output of the switched-mode power converter is reduced for a period of time after the brown-out condition is detected such that the effect of the ringing condition on the input voltage of the switched-mode power converter is reduced. In another embodiment, the switch of the switched-mode power converter is toggled after the power converter has been stopped in order to remove an erroneous sampled voltage on the input capacitor of the switched-mode power converter and allow proper detection of a subsequent brown-in condition.

Figure 1:
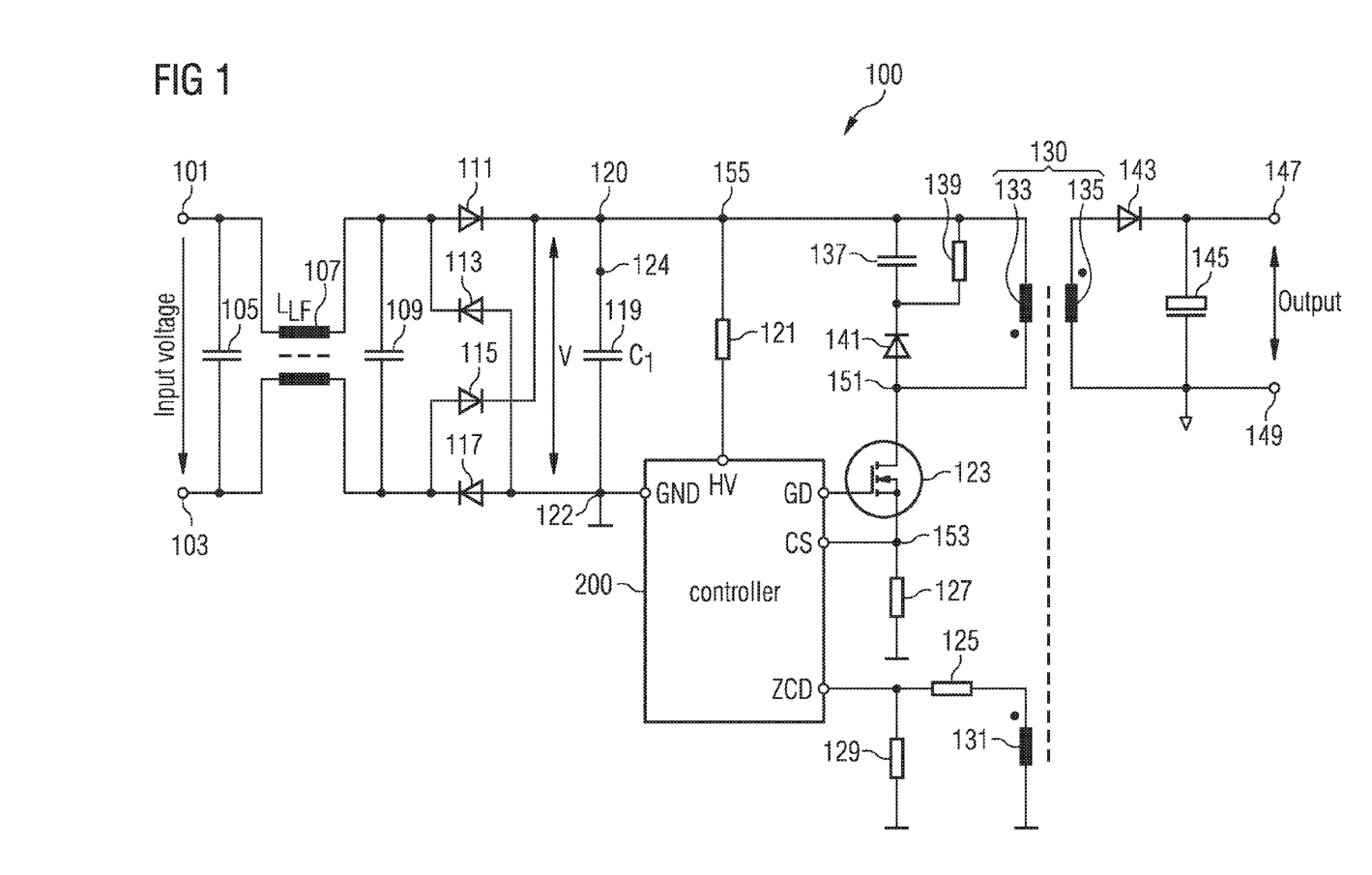
FIG. 1 illustrates a power conversion system that utilizes a switched-mode power converter in accordance with some embodiments.

FIG. 1 illustrates an exemplary power conversion system 100 in which an input AC voltage is applied at input ports 101 and 103 of the power conversion system 100. In some embodiments, AC input ports 101 and 103 are coupled to a rectifier circuit via optional line filter 107. As illustrated in FIG. 1, the rectifier circuit may be a bridge rectifier that includes diodes 111, 113, 115 and 117. The rectifier circuit converts the input AC voltage into a rectified AC voltage (e.g., a time-varying DC voltage) between a first output port 120 and a second output port 122 of the rectifier circuit. In some embodiments, the second output port 122 of the rectifier circuit is coupled to a reference voltage level, e.g., a ground level. Therefore, description below may only refer to the first output port 120 as an output port of the rectifier circuit, with the understanding that the second output port 122 is at a reference level, e.g., ground level. Additional components, such as input capacitors 105 and 109, may be used to filter out high-frequency noise in the circuit, as illustrated in FIG. 1.

Referring to FIG. 1, a capacitor 119 is coupled between output ports 120 and 122 of the rectifier circuit. A skilled artisan will readily recognize that the circuit to the right of capacitor 119 in FIG. 1 includes a switched-mode power converter, and in particular, a flyback power converter, details of which will be described in more details hereafter. Although FIG. 1 shows a flyback converter as an example, any other suitable converters, e.g., a buck converter, or a boost converter, could be used (e.g., replacing the flyback converter) in the power conversion system 100 illustrated in FIG. 1. Hence, discussion hereafter may refer to the flyback power converter in FIG. 1 as a power converter, or a switched-mode power converter. The voltage V across terminals of capacitor 119 is therefore equivalent to the input voltage of the switched-mode power converter, in accordance with some embodiments. The input port 155 of the switched-mode power converter is coupled to terminal 124 of capacitor 119, in various embodiments.

As illustrated in FIG. 1, the switched-mode power converter includes controller 200 that may be implemented using a power control integrated circuit (IC), a microcontroller, a processor, a digital signal processor (DSP), or any other suitable controller. Controller 200 monitors the status of the power conversions system 100, e.g., input and/or output voltages of the switched-mode power converter, and controls the operation of the switched-mode power converter by, e.g., suspending or resuming switching of the switched-mode power converter.

A sensing pin of controller 200, labeled HV in FIG. 1, is coupled to a first terminal 124 of capacitor 119 through a resistor 121, with the first terminal 124 of capacitor 119 being coupled to output port 120 of the rectifier circuit, in some embodiments. By measuring the signal at the sensing pin HV, controller 200 can monitor the input voltage of the switched-mode power converter. An output pin of controller 200, labeled GD in FIG. 1, is coupled to a control terminal of a switch 123 of the switched-mode power converter, in accordance with some embodiments. Switch 123 may be, e.g., a pass gate, an NMOS transistor, a PMOS transistor, or any other suitable switch. In the example of FIG. 1, switch 123 is an N-type transistor, and the control terminal of switch 123 is the gate electrode of transistor 123. In accordance with some embodiments, controller 200 generates a pulse sequence at output pin GD, which pulse sequence turns switch 123 on and off in accordance with a switching pattern of the pulse sequence, thus controlling the switching of the switched-mode power converter.

As illustrated in FIG. 1, a first terminal 151 (e.g., drain electrode 151 of transistor 123) of switch 123 is coupled to a first terminal of the primary winding 133 of transformer 130, which transformer also has a secondary winding 135 electromagnetically coupled to primary winding 133, in some embodiments. A second terminal of the primary winding 133 is coupled to terminal 124 of capacitor 119. In some embodiments, the switched-mode power converter further includes resistor 139, capacitor 137 and diode 141, which form a resistor-capacitor-diode (RCD) snubber circuit, as shown in FIG. 1. A diode 143 is coupled between a first terminal of the secondary winding 135 and output port 147 of the power conversion system 100, in some embodiments. In addition, a capacitor 145 is coupled between output ports 147 and 149 of the power conversion system 100, in some embodiments.

Still referring to FIG. 1, a second terminal 153 of switch 123 (e.g., source electrode 153 of transistor 123) is coupled to a reference level, e.g., a ground level, via a resistor 127, in some embodiments. In addition, the second terminal 153 of switch 123 may further be coupled to an input pin of controller 200, e.g., pin CS of controller 200, which input pin may be used by controller 200 for current sensing. In some embodiments, controller 200 has another sensing pin, e.g., pin ZCD, which is coupled to an auxiliary winding 131 via resistor 125 and coupled to a reference level (e.g., a ground level) via resistor 129. In accordance with some embodiments, auxiliary winding 131 is electromagnetically coupled to primary winding 133. As a result, a voltage proportional to the input voltage of the switched-mode power converter is available at the sensing pin ZCD while the switched-mode power converter is switching, which voltage at pin ZCD may be measured by controller 200 to monitor the input voltage of the switched-mode power converter, in accordance with some embodiments.

To detect a brown-out condition, the input AC voltage may be monitored by measuring the rectified AC voltage at the input of the power converter (e.g., measuring voltage across capacitor 119). However, errors may be introduced into the measured values of the rectified AC voltage, due to coupled switching noise and resonant ringing. In some embodiments, the resonant ringing is due to a resonant circuit formed by the inductance of the input filter (e.g., line filter 107) and the input capacitor(s). In accordance with some embodiments, switching of the power converter results in transient in the input current, and the transient in the input current causes a voltage across inductive component such as line filter 107, which voltage is added on top of the input AC voltage at the input of the rectifier circuit and causes a high-frequency time-varying voltage component at the output of the rectifier circuit, as discussed below with reference to FIG. 2.

Figure 2:
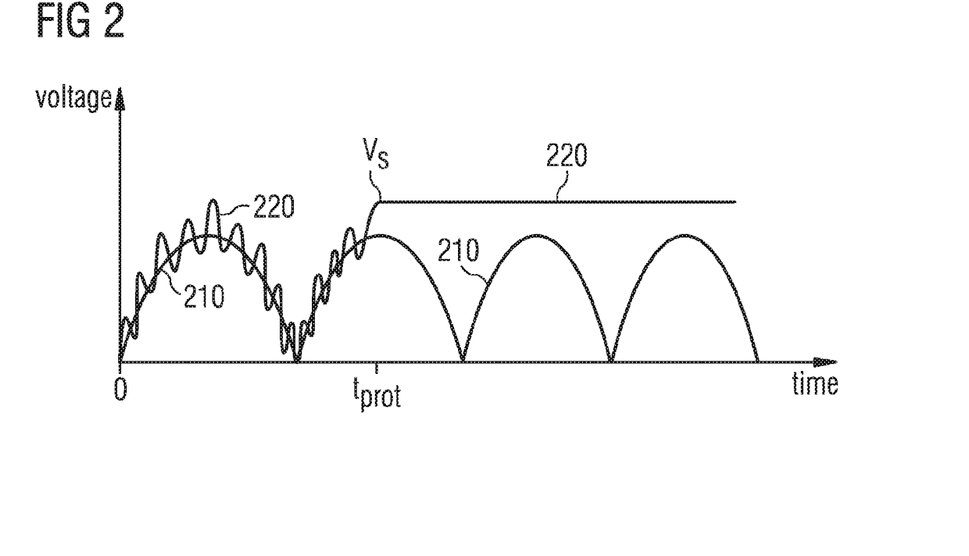
FIG. 2 illustrates a waveform diagram showing an ideal rectified AC voltage and an output voltage of a rectifier of a switched-mode power supply before and after switching is suspended.

FIG. 2 illustrates a waveform diagram showing an ideal rectified AC voltage 210 and an output voltage 220 of a rectifier of a switched-mode power supply before and after switching is suspended. Voltage 220 may correspond, for example, to the voltage across capacitor 119 shown in FIG. 1. The beginning portion of curve 220 (e.g., the portion between time t=0 and t=$t_{prot}$) illustrates the rectified AC voltage measured across capacitor 119 when the power converter is switching. For reference, FIG. 2 also illustrates a curve 210 showing an ideal rectified AC voltage, where "ideal" means that curve 210 does not have the effect of switching noise and resonant ringing. As illustrated in FIG. 2, curve 210 shows four cycles, or periods, of an ideal rectified AC voltage with a low frequency that is related to the frequency of the input AC voltage. In contrast, curve 220 has a high-frequency, time-varying voltage component which is caused by switching of the power converter and/or resonant ringing, in various embodiments. For ease of description hereafter, this high-frequency time-varying voltage component may be referred to as an inductance-induced voltage, or a switching-induced voltage. In some embodiments, when the power converter is switching, curve 220 is substantially equivalent to a corresponding portion of curve 210 with the switching-induced voltage added on top.

Power conversion system 100 monitors the rectified AC voltage (e.g., voltage across capacitor 119) and detects a brown-out condition by processing measured values of the rectified AC voltage using signal processing techniques, in some embodiments. Controller 200 may process current and previously measured values of the rectified AC voltage using signal processing techniques such as averaging, prediction, curve-fitting, and filtering (e.g., low-pass filtering) to obtain estimate of the rectified AC voltage, and compare the estimated AC voltage with a brown-out condition voltage threshold. In response to the detection of a brown-out condition, controller 200 changes the operation status of the power converter, in various embodiments. A simplistic method of operating the power conversion system is to suspend switching of the power converter upon detection of the brown-out condition, and resume switching later after a brown-in condition is subsequently detected. Although such a simplistic method may result in false brown-in condition detection, as discussed below with reference to FIG. 2, understanding the limitation of this simplistic method is conducive to the understanding of various embodiments in the present disclosure.

In the example shown in FIG. 2, a brown-out condition is detected at t=$t_{prot}$ and switching is suspended upon detection of the brown-out condition. In some embodiments, suspension of switching is achieved by opening switch 123 of the power converter (e.g., forming high impedance between first terminal 151 and second terminal 153 in FIG. 1). Referring back to FIG. 1 temporarily. When switch 123 is in the open state (e.g., high impedance), the rectifier circuit and capacitor 119 form a peak detector that holds the maximum voltage applied across capacitor 119, in accordance with some embodiments. For example, when a new voltage $V_2$ at the output port 120 of the rectifier circuit is larger than a previously held maximum voltage $V_1$, the new voltage $V_2$ charges capacitor 119 and voltage $V_2$ is held by capacitor 119 as the new maximum voltage; conversely, when voltage at the output port 120 of the rectifier circuit drops below a previously held maximum voltage $V_1$, capacitor 119 could not discharge (e.g., due to diodes 111 and 115 in the rectifier circuit being reversely biased), thus capacitor 119 still holds voltage $V_1$.

Referring back to FIG. 2, after switching is suspended upon detection of a brown-out condition at t=$t_{prot}$, the voltage value $V_s$ of the rectified AC voltage at time $t_{prot}$ is held by capacitor 119. Due to the switching-induced voltage, voltage $V_s$ might have a spurious large value, although the ideal rectified AC voltage (e.g., curve 210) is below the brown-out condition voltage threshold. This spurious large voltage $V_s$ is held by capacitor 119 (see the portion of curve 220 after t=$t_{prot}$) due to capacitor 119 and the rectifier circuit functioning as a peak detector. Controller 200 of the power conversion system 100 monitors the voltage across capacitor 119 to detect a brown-in condition, in some embodiments. However, since voltage $V_s$ held by capacitor 119 is larger than the threshold for brown-in condition detection, controller 200 may incorrectly determine that a brown-in condition has occurred. As an example, consider a case where the brown-out condition and brown-in condition have voltage thresholds of 80 V and 85 V, respectively. Assume that switching is stopped as soon as brown-out condition is detected at t=$t_{prot}$, and capacitor 119 holds a voltage $V_s$ of 86 V due to the switching-induced voltage. Although the AC input voltage (indicated by the ideal rectified AC voltage curve 210) is below 85 V, the measured voltage values across capacitor 119 is 86 V, thus controller 200 of the power conversion system might incorrectly determine the existence of a brown-in condition. After the power conversion system resumes switching based on the false detection of brown-in condition, capacitor 119 is able to discharge and the voltage across capacitor 119 follows curve 210 (not shown in FIG. 2), and controller 200 may realize that the input AC voltage is still low and detect a brown-out condition again. This may cause the power conversion system to toggle back and forth between brown-out detection and brown-in detection, disrupting the proper operation of the power conversion system.

Figure 3:
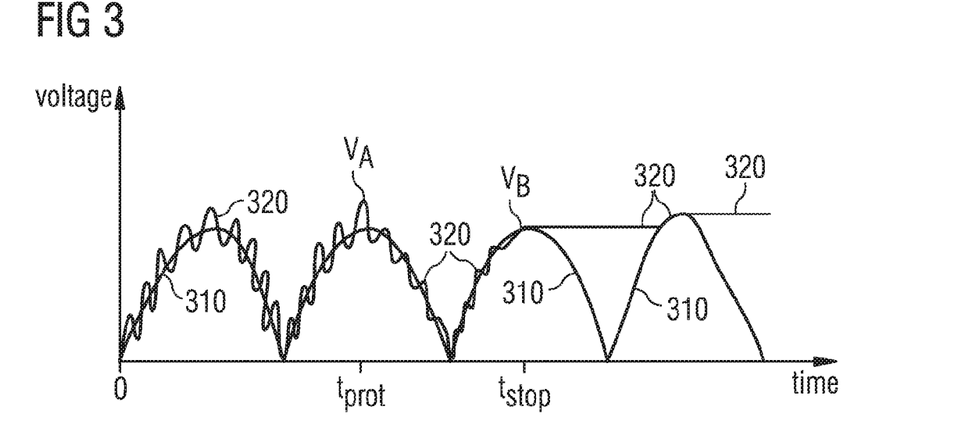
FIG. 3 illustrates a waveform diagram showing an ideal rectified AC voltage and an output voltage of a rectifier of an embodiment switched-mode power supply in which switching is suspended after the output power is reduced.

An embodiment method for operating a power conversion system is described with reference to FIG. 3. In FIG. 3, curve 310 represents the ideal rectified AC voltage similar to curve 210 in FIG. 2. Curve 320 represents the rectified AC voltage measured between terminals of capacitor 119 of FIG. 1. In the example of FIG. 3, the power conversion system is switching in the beginning. To detect a brown-out condition while the power converter is switching, controller 200 may form an estimate of the input AC voltage by, e.g., processing current and previously measured values of the rectified AC voltage (e.g., voltage across capacitor 119). As discussed earlier with reference to FIG. 1, the rectified AC voltage is obtained directly by measuring the signal at a first sensing pin (e.g., HV pin), in some embodiments. In other embodiments, the rectified AC voltage is obtained indirectly by measuring the signal at a second sensing pin (e.g., ZCD pin) coupled to an auxiliary winding 131, which auxiliary winding is electromagnetically coupled to a primary winding 133 of the power converter. In various embodiments, currently and previously measured values of the rectified AC voltage during the past one or more cycles may be processed using suitable signal processing techniques to obtain an estimate of the input AC voltage. Examples of suitable signal processing techniques include, but are not limited to, averaging, prediction, curve-fitting, and filtering (e.g., low-pass filtering). The estimated input voltage is compared to a pre-determined low voltage threshold to detect a brown-out condition. In some embodiments, the pre-determined low voltage threshold is adjusted for voltage measured at different sensing pins. For example, depending on factors such as the turns ratio between the primary winding 133 and the auxiliary winding 131 and the resistance of resistors 125 and 129, the measured voltage value at the second sensing pin (e.g., ZCD pin) is proportional to the input voltage of the switched-mode power converter, therefore, the brown-out condition low voltage threshold may need to be adjusted accordingly.

Referring to FIG. 3, upon detection of a brown-out condition at time t=$t_{prot}$, switching is not stopped immediately at $t_{prot}$; instead, switching continues for a certain amount of time (e.g., from $t_{prot}$ to $t_{stop}$) while the output power of the switched-mode converter is gradually reduced, and switching is suspended after the output power is reduced to a pre-determined level. The output power of the switched-mode power converter is reduced by gradually reducing the peak current of the power converter, for example, when controller 200 uses peak-current control in accordance with some embodiments.

In other embodiments, controller 200 controls a pulse-width-modulation (PWM) generator 218 of controller 200 (see FIG. 7) to change the switching pattern of the power converter to reduce the output power of the power converter, where the switching pattern includes parameters such as switching frequency, duty cycle, on time, and off time. For example, the maximum duty cycle of the switching pattern may be reduced from almost 100% to a lower duty cycle of, e.g., between about 20% to about 30%. For power converters such as flyback converters, output power is quadratically proportional to the on time. Thus, reducing the duty cycle may effectively reduce the output power under some conditions. In other embodiments, the off time of the switching pattern is extended to reduce the output power of the power converter. The reduction of output power happens gradually over a certain period of time, e.g., less than a cycle or more than a cycle, depending on factors such as the original output power and the reduced output power, in accordance with some embodiments.

As the output power of the power converter is gradually reduced, the input current and the transient in the input current are reduced, which results in smaller inductance-induced voltage. As illustrated in FIG. 3, curve 320 gradually becomes smoother from time $t_{prot}$ to time $t_{stop}$ due to diminishing inductance-induced voltage, and curve 320 becomes very close to the ideal rectified AC voltage curve 310 at time $t_{stop}$. At time $t_{stop}$, switching of the power converter is suspended. After switching is suspended, inductance-induced voltage is significantly attenuated and/or no longer exists. The combination of capacitor 119 and the rectifier circuit can be viewed as a peak detector, in some embodiments. For example, curve 320 in FIG. 3 shows a voltage $V_B$ being held by capacitor 119 after time $t_{stop}$ until a higher voltage replaces $V_B$. Note that since switching-induced voltage has been reduced considerably, voltage $V_B$ does not have a spurious large value. Controller 200 monitors the voltage across capacitor 119 (e.g., voltage shown in curve 320) and compares the voltage with the brown-in condition voltage threshold, and upon detecting a brown-in condition (e.g., input voltage rises above the brown-in condition voltage threshold), resumes switching of the power converter, in accordance with some embodiments. In the example of FIG. 3, time $t_{stop}$ for suspending switching of the power converter is shown at a peak position of curve 310. However, time $t_{stop}$ is not limited to the peak position and could be anywhere within a cycle once the output power of the power converter has been reduced sufficiently.

Figure 4A:
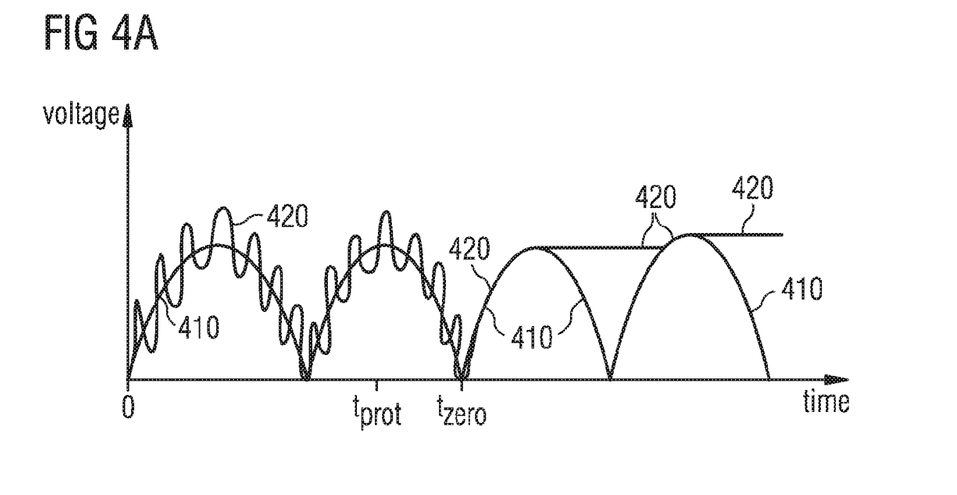
FIGS. 4A and 4B illustrate waveform diagrams showing ideal rectified AC voltages and output voltages of a rectifier for other embodiment switched-mode power supply systems.
Figure 4B:
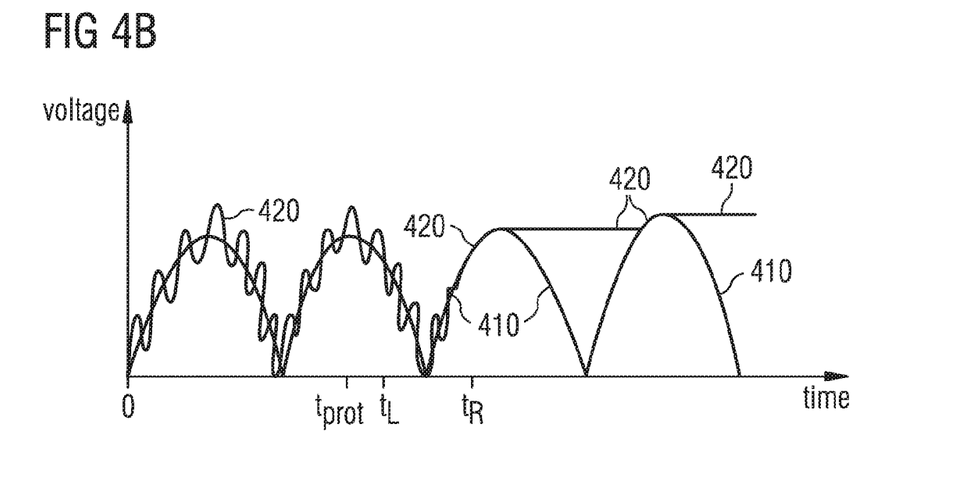

FIGS. 4A and 4B illustrate waveform diagrams corresponding to a further embodiment brown-out detection method. Curve 410 represents the ideal rectified AC voltage similar to curve 210 in FIG. 2 and curve 420 represents the rectified AC voltage measured between terminals of capacitor 119 of FIG. 1. In an embodiment of the present invention, instead of reducing the output power of the power converter, controller 200 stops switching the power converter at a pre-determined time within a cycle after detection of brown-out condition. In the examples of FIGS. 4A and 4B, brown-out conditions are detected at time t=$t_{prot}$. Referring to FIG. 4A, the pre-determined time may correspond to time $t_{zero}$ within a cycle when the ideal rectified AC voltage 410 is low, e.g., at or near zero. Because the ideal rectified AC voltage is at or near zero at time $t_{zero}$, voltage held at capacitor 119 at time $t_{zero}$ is also small (e.g. smaller than the brown-in condition voltage threshold) when the switching of power converter is suspended. After switching is suspended, the voltage across capacitor 119, shown in curve 420, tracks the maximum input voltage, as illustrated by the behavior of curve 420 after time $t_{zero}$ in various embodiments. Alternatively, referring to FIG. 4B, the pre-determined time to suspend switching may be a time within a range, e.g., between time $t_L$ and $t_R$ in FIG. 4B, where $t_L$ and $t_R$ are chosen such that there is a large margin between the ideal rectified AC voltage 410 and the brown-in condition voltage threshold within the range between $t_L$ and $t_R$, so that the voltage held by capacitor 119 is below the brown-in condition voltage threshold when the switching of power converter is suspended. In some embodiments, after suspending switching at the preferred time, controller 200 monitors the peak detector output voltage across capacitor 119 (e.g., curve 420) and detects the brown-in condition. The methods described above with reference to FIGS. 4A and 4B use knowledge of the rectifier circuit output, e.g., phases of the rectifier circuit output voltage, so that controller 200 can stop switching at the pre-determined time.

Figure 5A:
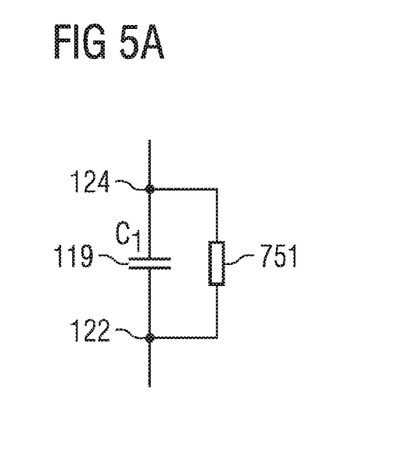
FIGS. 5A and 5B illustrate circuits used for operating a power system, in accordance with some embodiments.
Figure 5B:
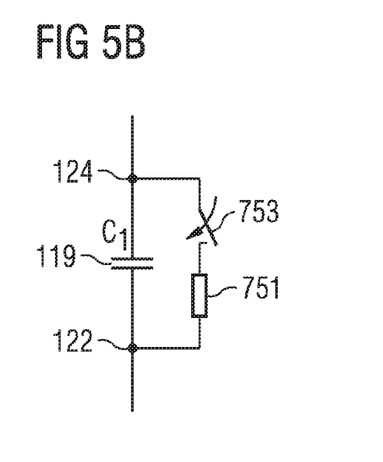

In yet another embodiment method, a resistor 751 is coupled in parallel to capacitor 119, as illustrated in FIG. 5A. Resistor 751 allows capacitor 119 to discharge after switching of the power converter is suspended, therefore, no peak detector is formed and voltage V across capacitor 119 follows the rectifier output voltage (e.g., ideal rectified AC voltage plus switching-induced voltage). As a result, controller 200 could suspend switching upon detection of a brown-out condition. Brown-in condition may be detected by processing measured values of the rectified AC voltage using signal processing techniques, similar to the process for brown-out condition detection. The resistor 751, however, may cause a loss of efficiency. Another method is illustrated in FIG. 5B, where a switch 753 is coupled between resistor 751 and capacitor 119. Switch 753 is at the open position (e.g., high impedance) during normal operation (e.g., power converter is switching). After a brown-out condition is detected, controller 200 suspends the switching of the power converter and closes switch 753, which allows voltage across capacitor 119 to follow the rectifier output voltage, hence allowing for proper detection of a brown-in condition. Alternatively, controller 200 could stop switching of the power converter, close switch 753 for a short period time to discharge capacitor 119, then open switch 753 again. In some embodiments, the voltage across capacitor 119 is discharged to a voltage below a brown-in condition voltage threshold to avoid a spurious large voltage being held at capacitor 119. This allows controller 200 to properly detect a subsequent brown-in condition without false detection, in various embodiments.

Figure 6:
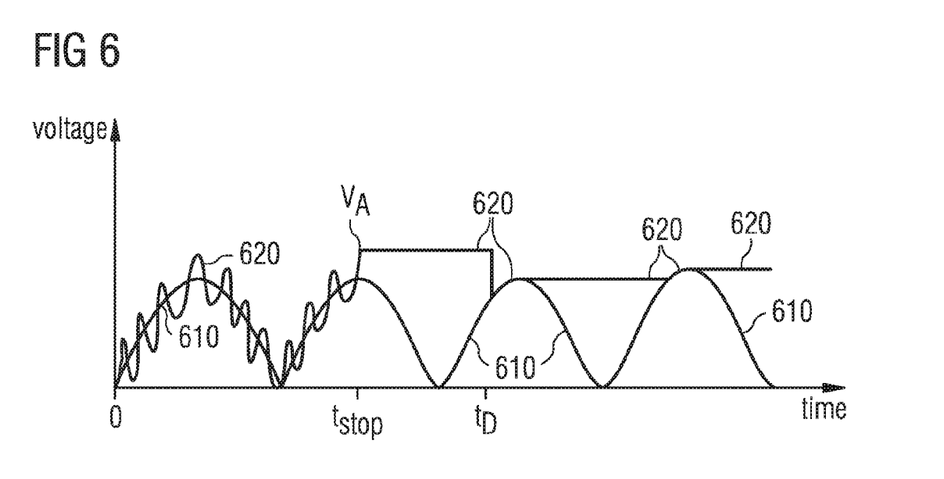
FIG. 6 illustrates the ideal rectified AC voltage and the rectifier circuit output voltage, in accordance with various embodiment methods of operating a power system.

FIG. 6 illustrates waveform diagrams corresponding to a further embodiment method for operating a power system. Curve 610 represents the ideal rectified AC voltage and curve 620 represents the voltage across capacitor 119 in accordance with the present embodiment. As illustrated in FIG. 6, the power converter is switching from time t=0 to time t=$t_{stop}$ as shown with respect to curve 620 that represents the corresponding voltage across capacitor 119. At time t=$t_{stop}$, a brown-out condition is detected and switching of the power converter is suspended, in accordance with some embodiments. After suspension of the switching, the rectifier circuit and capacitor 119 function as a peak detector, as shown by the behavior of curve 620 after t=$t_{stop}$. In the example shown in FIG. 6, capacitor 119 holds a spurious large voltage $V_A$ when switching is suspended. Subsequently, after a pre-determined amount of time (e.g., a fraction of a cycle, one cycle, or more than one cycle), at time t=$t_D$, switch 123 (see FIG. 1) is closed (e.g., short circuit) for a pre-determined amount of time to discharge capacitor 119, in various embodiments. Switch 123 may be closed by a pulse generated by controller 200 and applied at a control terminal of switch 123. The duration of the pulse, or pulse width, may be determined by factors such as the capacitance of capacitor 119, the inductance of line filter 107, and the input voltage of the system. For example, for a capacitor 119 of 100 nF and an input voltage in the range of 80V to 100V, a pulse width of about 2 µs to about 5 µs may be used, although other pulse widths are also possible and are within the scope of the present disclosure.

In accordance with some embodiments, capacitor 119 is discharged such that a voltage across capacitor 119 is below the brown-in condition voltage threshold. As shown in the example of FIG. 6, the voltage across capacitor 119 drops at time $t_D$ due to the discharge, and after discharge is completed, the voltage across capacitor 119 tracks the peak of the rectifier output voltage (e.g., curve 610). In some embodiments, controller 200 monitors the voltage across capacitor 119 and processes the measured voltage values for brown-in condition detection; upon detection of the brown-in condition, controller 200 resumes switching of the power converter. Although FIG. 6 shows that switching is suspended upon detection of brown-out condition at $t_{stop}$, a skilled artisan will appreciate that switching could be suspended at a time between $t_{stop}$ and $t_D$ without departing from the spirit of the current disclosure.

Figure 7:
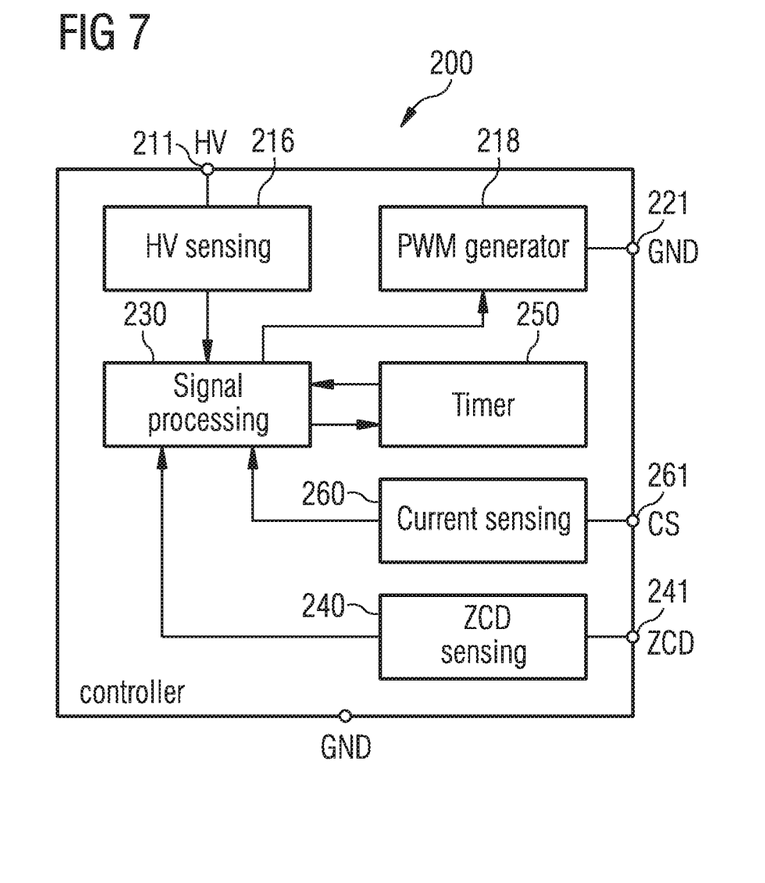
FIG. 7 illustrates an embodiment diagram of a controller of a power conversion system.

FIG. 7 illustrates an embodiment diagram of a controller 200. As illustrated in FIG. 7, controller 200 includes a first sensing circuit 216 (e.g., the HV sensing circuit), a second sensing circuit 240 (e.g., the ZCD sensing circuit), a pulse-width-modulation (PWM) generator 218, and a signal processing circuit 230. The first sensing circuit 216 is coupled to a first input pin 211 (e.g., the HV pin) and measures a signal at the first input pin 211 to provide a measured value (e.g., a measured voltage value) of the first signal at the first input pin 211, in some embodiments. The second sensing circuit 240 is coupled to a second input pin 241 (e.g., the ZCD pin) and measures a signal at the second input pin 241 to provide a measured value (e.g., a measured voltage value) of the second signal at the second input pin 241, in some embodiments. As discussed above with reference to FIG. 1, the first sensing circuit 216 may directly measure the input voltage of the switched-mode power converter by measuring the voltage V across capacitor 119. Alternatively, the second sensing circuit 240 may indirectly measure the input voltage of the switched-mode power converter by measuring the signal at the second input 241 coupled to auxiliary winding 131 while the power converter is switching.

The PWM generator 218 generates a pulse sequence with a certain switching pattern at an output pin 221 (e.g., the GD pin), where the switching pattern includes parameters such as switching frequency, duty cycle, on time and off time of the pulses. In some embodiments, output of the PWM generator 218 is coupled to the control terminal of switch 123 (see FIG. 1). The measured signal values from the first sensing circuit 216 and/or the second sensing circuit 240 are sent to the signal processing circuit 230, which monitors the signals at the first input pin 211 and/or the second input pin 241, e.g., by checking the measured signal values, in some embodiments. Based on the measured signal values, controller 200 detects and determines status of the power conversion system 100, and send control signals to PWM generator 218 to modify the switching pattern of the pulse sequence, which in turn controls switch 123 to change the status of the power conversion system 100, in some embodiments. For example, controller 200 may instruct PWM generator 218 to generate a voltage level (e.g., a high or a low voltage) to open switch 123, thus stopping or suspending switching of the power converter; or, controller 200 may instruct PWM generator 218 to generate a single pulse to close the switch 123 for a pre-determined amount of time then open the switch 123, e.g., to discharge capacitor 119. As another example, controller 200 may instruct PWM generator 218 to change the switching pattern to alter the output power of the switched-mode power converter.

Figure 8:
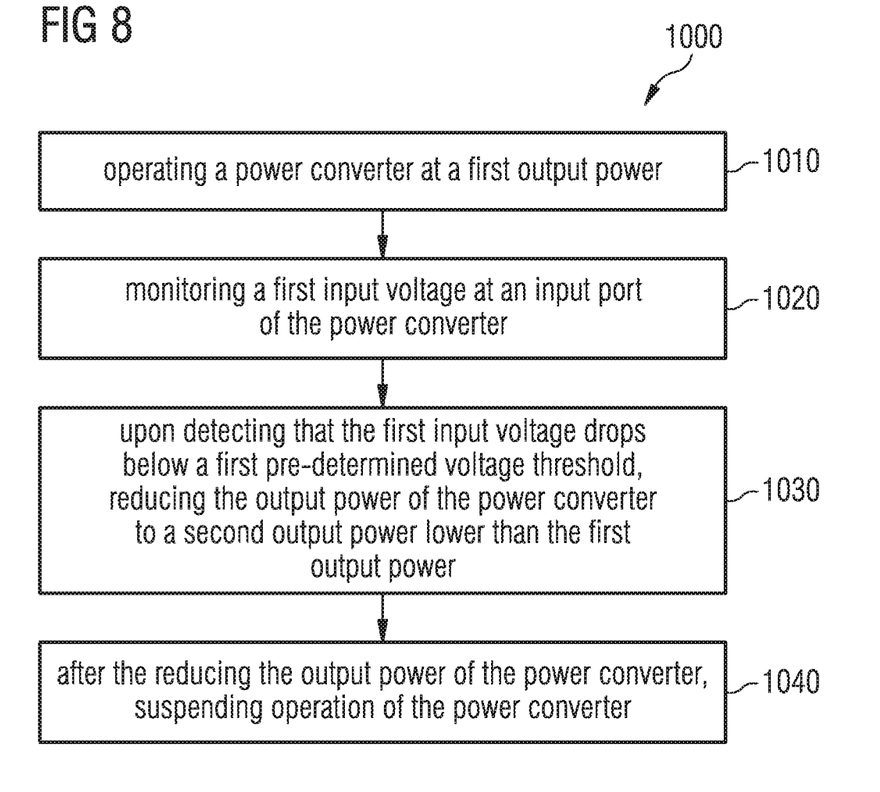
FIG. 8 illustrates a flowchart of a method for operating a power system, in accordance with some embodiments.
Figure 9:
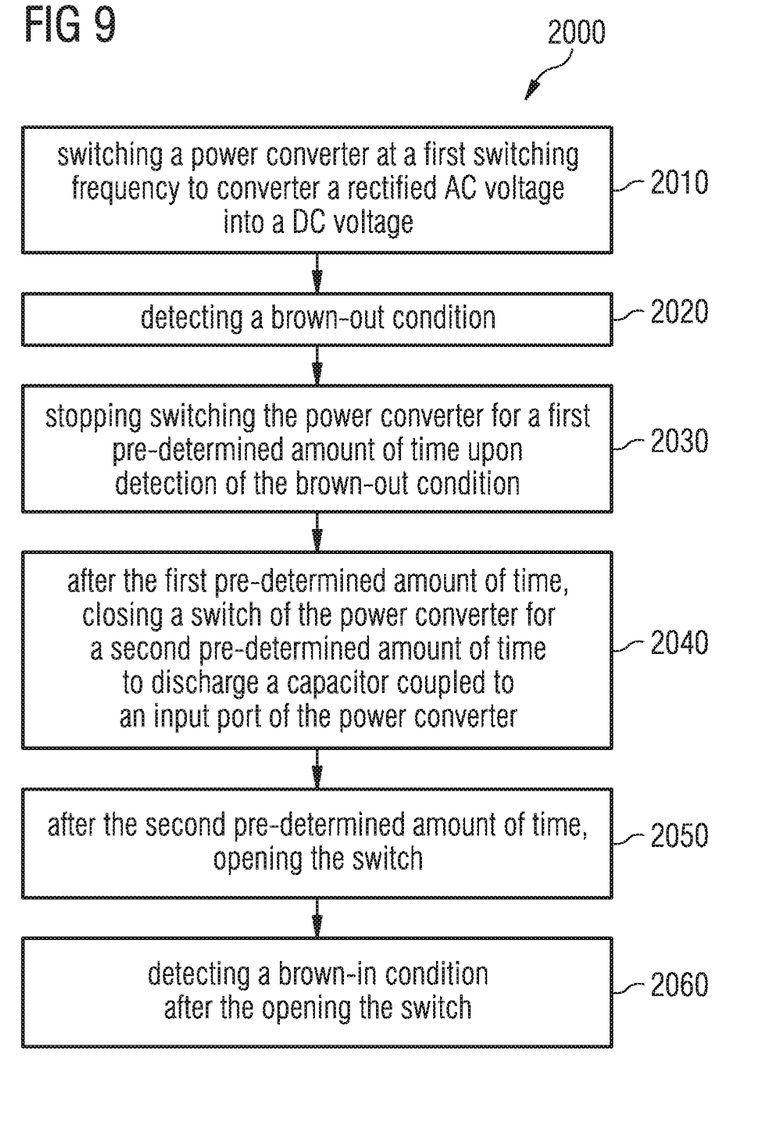
FIG. 9 illustrates a flowchart of a method for operating a power converter, in accordance some embodiments.

FIG. 8 illustrates a flow chart of a method for operating a power system, in accordance with some embodiments. FIG. 9 illustrates a flow chart of a method for operating a power converter, in accordance with other embodiments. It should be understood that the embodiment methods shown in FIGS. 8 and 9 are two examples of many possible embodiment methods. One of ordinary skill in the art would recognize many variations, alternatives, and modifications. For example, various steps as illustrated in FIGS. 8 and 9 may be added, removed, replaced, rearranged and repeated.

As shown in FIG. 8, a power converter is operated at a first output power in step 1010. At step 1020, a first input voltage at an input port of the power converter is monitored. At step 1030, upon detecting that the first input voltage drops below a first pre-determined voltage threshold, the output power of the power converter is reduced to a second output power lower than the first output power. At step 1040, after the reducing the output power of the power converter, operation of the power converter is suspended.

Referring to FIG. 9, a power converter is switched at a first switching frequency to convert a rectified AC voltage into a DC voltage in step 2010. At step 2020, a brown-out condition is detected. At step 2030, switching of the power converter is stopped for a first pre-determined amount of time upon detection of the brown-out condition. At step 2040, after the first pre-determined amount of time, a switch of the power converter is closed for a second pre-determined amount of time to discharge a capacitor to an input port of the power converter. At step 2050, after the second pre-determined amount of time, the switch is opened. At step 2060, a brown-in condition is detected after the opening the switch.

In accordance with some embodiments, circuits or systems may be configured to perform particular operations or actions by virtue of having software, firmware, hardware, or a combination of them installed on the system that in operation causes or cause the system to perform the actions. One general aspect includes a method of operating a power system, the method includes operating a power converter at a first output power, monitoring a first input voltage at an input port of the power converter, and upon detecting that the first input voltage drops below a first pre-determined voltage threshold, reducing the first output power of the power converter to a second output power lower than the first output power, and suspending operation of the power converter after the reducing the first output power of the power converter. Other embodiments of this aspect include corresponding circuits and systems configured to perform the various actions of the methods.

Implementations may include one or more of the following features. The method further includes after the suspending, resuming operation of the power converter upon detecting that the first input voltage rises above a second pre-determined voltage threshold. In some embodiments, the detecting that the first input voltage rises above the second pre-determined voltage threshold includes measuring an output of a peak detector while operation of the power converter is suspended, where the peak detector includes a capacitor coupled in parallel to a rectifier circuit. The method further including rectifying an AC voltage to produce the first input voltage. In some embodiments, the operating the power converter includes switching the power converter at a first switching frequency with a first duty cycle. In an embodiment, the monitoring the first input voltage includes measuring a voltage across a capacitor coupled to the input port of the power converter while the power converter is switching. In various embodiments, the monitoring the first input voltage includes measuring a second voltage at the output of a transformer electromagnetically coupled to the power converter while the power converter is switching.

In accordance with some embodiments, the reducing the first output power of the power converter includes reducing a peak current of the power converter. In other embodiments, the reducing the first output power of the power converter includes modifying a switching pattern of the power converter. In an embodiment, the modifying the switching pattern includes reducing a duty cycle of the switching pattern of the power converter. In another embodiment, the modifying the switching pattern includes increasing an off time of the switching pattern of the power converter. In various embodiments, the suspending operation of the power converter includes opening a switch of the power converter.

Another general aspect includes a method of operating a power conversion system by switching a power converter at a first switching frequency to convert a rectified AC voltage into a DC voltage, detecting a brown-out condition, and stopping switching the power converter for a first pre-determined amount of time upon detection of the brown-out condition. The method also includes after the first pre-determined amount of time, closing a switch of the power converter for a second pre-determined amount of time to discharge a capacitor coupled to an input port of the power converter. The method further includes after the second pre-determined amount of time, opening the switch, and detecting a brown-in condition after the opening the switch.

Implementations may include one or more of the following features. The method may further include resuming switching the power converter after the detecting the brown-in condition. In some embodiments, the detecting the brown-out condition includes measuring a first voltage between terminals of the capacitor, and comparing the first voltage to a pre-determined low voltage threshold. In other embodiments, the detecting the brown-out condition includes measuring a second voltage at an output of a transformer coupled to the power converter, and comparing the second voltage to a pre-determined low voltage threshold. In some embodiments, the closing the switch of the power converter discharges the capacitor such that a voltage across the capacitor is lower than a pre-determined high voltage threshold. The detecting the brown-in condition may include measuring a first voltage between terminals of the capacitor, and comparing the first voltage to a pre-determined high voltage threshold.

A further general aspect includes a power conversion system including a controller, where the controllers includes a pulse generating circuit configured to produce pulses with a first pulse pattern at a first output terminal of the controller, the first output terminal configured to be coupled to a switch of the power conversion system. The controller also includes a first sensing circuit configured to measure a first signal at a first sensing pin of the controller and provide a first measured value of the first signal at the first sensing pin, and a signal processing circuit with a first input coupled to the first sensing circuit and a first output coupled to the pulse generating circuit. The signal processing circuit is configured to: compare the first measured value of the first signal with a pre-determined low voltage threshold to detect a brown-out condition while the power conversion system is switching, after detection of the brown-out condition, change the first pulse pattern of the pulse generating circuit to reduce an output power of the power conversion system, and after reduction of the output power, suspend switching of the power conversion system.

Implementations may include one or more of the following features. The power conversion system may further include a switch, where a control terminal of the switch is coupled to the first output terminal of the controller. The power conversion system may further include a rectifier circuit, where an output port of the rectifier circuit is coupled to the first sensing pin of the controller. The power conversion system may further including a transformer, where a first terminal of the transformer is coupled to a first terminal of the switch, a second terminal of the transformer is coupled to the output port of the rectifier circuit. The power conversion system may further include a first resistor coupled between the first sensing pin of the controller and a first terminal of a capacitor coupled to the output port of the rectifier circuit, where the signal processing circuit is further configured to compare the first measured value of the first signal with a pre-determined high voltage threshold to detect a brown-in condition while switching of the power conversion system is suspended, and resume switching of the power conversion system upon detection of the brown-in condition. The power conversion system may further include a second resistor coupled between the first sensing pin of the controller and a first terminal of an auxiliary winding, the auxiliary winding being electromagnetically coupled to a primary winding of the transformer. The controller of the power conversion system may further includes a second sensing circuit configured to measure a second signal at a second sensing pin of the controller and provide a second measured value of the second signal. The power conversion system may further include a third resistor coupled between the second sensing pin of the controller and a first terminal of a capacitor coupled to the output port of the rectifier circuit, where the signal processing circuit is further configured to compare the second measured value of the second signal with a pre-determined high voltage value to detect a brown-in condition while switching of the power conversion system is suspended, and resume switching of the power conversion system upon detection of the brown-in condition.

In some embodiments, the signal processing circuit of the power conversion system is configured to decrease a duty cycle of the first pulse pattern of the pulse generating circuit to reduce an output power of the power conversion system. In other embodiments, the signal processing circuit of the power conversion system is configured to increase an off time of the first pulse pattern of the pulse generating circuit to reduce an output power of the power conversion system. In yet another embodiment, the signal processing circuit of the power conversion system is configured to reduce a peak current of the power conversion system to reduce an output power of the power conversion system.

Advantages of embodiment systems and methods include the ability to reliably detect brown-in conditions while avoiding false brown-in detection. For example, with respect to the embodiment method illustrated in FIG. 3, the power converter suspends switching of the power converter in a controlled fashion, for example, by gradually reducing the output power of the power converter before suspending switching. By reducing the output power, switching-induced voltage is reduced, and the voltage held by capacitor 119 after suspension of switching tracks the voltage peak of the rectifier circuit output properly, thus avoiding a false brown-in condition detection. In the embodiment method illustrated in FIG. 6, the power supply discharges capacitor 119 before a brown-in condition is detected. Since the voltage across capacitor 119 is discharged to a lower voltage than the brown-in condition voltage threshold, false brown-in condition detection is also avoided.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a power system, the method comprising:
   operating a power converter at a first output power by switching the power converter using a first switching pattern;
   monitoring a first input voltage at an input port of the power converter; and
   upon detecting that the first input voltage drops below a first pre-determined voltage threshold
      reducing the first output power of the power converter to a second output power lower than the first output power by switching the power converter using a second switching pattern different from the first switching pattern, wherein the second switching pattern switches the power converter, and
      suspending operation of the power converter after the reducing the first output power of the power converter.

2. The method of claim 1, further comprising:
   after the suspending, resuming operation of the power converter upon detecting that the first input voltage rises above a second pre-determined voltage threshold.

3. The method of claim 2, wherein the detecting that the first input voltage rises above the second pre-determined voltage threshold comprises:
   measuring an output of a peak detector while operation of the power converter is suspended, the peak detector comprising a capacitor coupled in parallel to a rectifier circuit.

4. The method of claim 1, further comprising rectifying an AC voltage to produce the first input voltage.

5. The method of claim 1, wherein the operating the power converter comprises switching the power converter at a first switching frequency with a first duty cycle.

6. The method of claim 1, wherein the monitoring the first input voltage comprises measuring a voltage across a capacitor coupled to the input port of the power converter while the power converter is switching.

7. The method of claim 1, wherein the monitoring the first input voltage comprises measuring a second voltage at an output of a transformer electromagnetically coupled to the power converter while the power converter is switching.

8. The method of claim 1, wherein the reducing the first output power of the power converter comprises reducing a peak current of the power converter.

9. The method of claim 1, wherein the reducing the first output power of the power converter comprises modifying a switching frequency of the power converter.

10. The method of claim 9, wherein a duty cycle of the second switching pattern is smaller than a duty cycle of the first switching pattern.

11. The method of claim 9, wherein an off time of the second switching pattern is longer than an off time of the first switching pattern.

12. The method of claim 1, wherein the suspending operation of the power converter comprises opening a switch of the power converter.

13. A method of operating a power conversion system, the method comprising:
   switching a power converter at a first switching frequency to convert a rectified AC voltage into a DC voltage;
   detecting a brown-out condition;
   stopping switching the power converter for a first pre-determined amount of time upon detection of the brown-out condition;
   after the first pre-determined amount of time, closing a switch of the power conversion system for a second pre-determined amount of time to discharge a capacitor coupled to an input port of the power converter while switching of the power converter is stopped;
   after the second pre-determined amount of time, opening the switch while switching of the power converter is stopped; and
   detecting a brown-in condition after the opening the switch.

14. The method of claim 13, further comprising resuming switching the power converter after the detecting the brown-in condition.

15. The method of claim 13, wherein the detecting the brown-out condition comprises:

measuring a first voltage between terminals of the capacitor; and comparing the first voltage to a pre-determined low voltage threshold.

16. The method of claim 13, wherein the detecting the brown-out condition comprises:

measuring a second voltage at an output of a transformer coupled to the power converter; and comparing the second voltage to a pre-determined low voltage threshold.

17. The method of claim 13, wherein the switch of the power conversion system is coupled between a first terminal of the capacitor and a first terminal of a resistor, and a second terminal of the capacitor is coupled to a second terminal of the resistor, wherein the closing the switch of the power conversion system discharges the capacitor such that a voltage across the capacitor is lower than a pre-determined high voltage threshold.

18. The method of claim 13, wherein the detecting the brown-in condition comprises:

measuring a first voltage between terminals of the capacitor; and comparing the first voltage to a pre-determined high voltage threshold.

19. A power conversion system comprising:

a controller, wherein the controllers comprises:

a pulse generating circuit configured to produce pulses with a first pulse pattern at a first output terminal of the controller, the first output terminal configured to be coupled to a switch of the power conversion system;

a first sensing circuit configured to measure a first signal at a first sensing pin of the controller and provide a first measured value of the first signal at the first sensing pin; and a signal processing circuit with a first input coupled to the first sensing circuit and a first output coupled to the pulse generating circuit, wherein the signal processing circuit is configured to compare the first measured value of the first signal with a pre-determined low voltage threshold to detect a brown-out condition while the power conversion system is switching, after detection of the brown-out condition, change the first pulse pattern of the pulse generating circuit to reduce an output power of the power conversion system while the power conversion system is switching, and after reduction of the output power, suspend switching of the power conversion system.

20. The power conversion system of claim 19, further comprising a switch, wherein a control terminal of the switch is coupled to the first output terminal of the controller.

21. The power conversion system of claim 19, further comprising a rectifier circuit, wherein an output port of the rectifier circuit is coupled to the first sensing pin of the controller.

22. The power conversion system of claim 21, further comprising a transformer, wherein a first terminal of the transformer is coupled to a first terminal of the switch, a second terminal of the transformer is coupled to the output port of the rectifier circuit.

23. The power conversion system of claim 22, further comprising a first resistor coupled between the first sensing pin of the controller and a first terminal of a capacitor coupled to the output port of the rectifier circuit, wherein the signal processing circuit is further configured to compare the first measured value of the first signal with a pre-determined high voltage threshold to detect a brown-in condition while switching of the power conversion system is suspended, and resume switching of the power conversion system upon detection of the brown-in condition.

24. The power conversion system of claim 22, further comprising a second resistor coupled between a second sensing pin of the controller and a first terminal of an auxiliary winding, the auxiliary winding being electromagnetically coupled to a primary winding of the transformer.

25. The power conversion system of claim 24, wherein the controller further comprises a second sensing circuit configured to measure a second signal at the second sensing pin of the controller and provide a second measured value of the second signal.

26. The power conversion system of claim 25, further comprising a third resistor coupled between the second sensing pin of the controller and a reference voltage terminal, wherein the signal processing circuit is further configured to compare the second measured value of the second signal with a pre-determined low voltage value to detect a brown-out condition.

27. The power conversion system of claim 19, wherein the signal processing circuit is configured to decrease a duty cycle of the first pulse pattern of the pulse generating circuit to reduce an output power of the power conversion system.

28. The power conversion system of claim 19, wherein the signal processing circuit is configured to increase an off time of the first pulse pattern of the pulse generating circuit to reduce an output power of the power conversion system.

29. The power conversion system of claim 19, wherein the signal processing circuit is configured to reduce a peak current of the power conversion system to reduce an output power of the power conversion system.

* * * * *